(12) United States Patent
Lidorikis et al.

(10) Patent No.: US 7,187,832 B2
(45) Date of Patent: Mar. 6, 2007

(54) GAP-SOLITON DEVICES IN PHOTONIC CRYSTAL FIBERS

(75) Inventors: Elefterios Lidorikis, Arlington, MA (US); Marin Soljacic, Somerville, MA (US); Mihai Ibanescu, Piatra Neamt (RO); Yoel Fink, Cambridge, MA (US); John D. Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 53 days.

(21) Appl. No.: 10/671,652

(22) Filed: Sep. 25, 2003

(65) Prior Publication Data

US 2004/0120670 A1 Jun. 24, 2004

Related U.S. Application Data

(60) Provisional application No. 60/414,768, filed on Sep. 30, 2002.

(51) Int. Cl.
*G02B 6/02* (2006.01)
*G02B 6/00* (2006.01)

(52) U.S. Cl. .................. 385/125; 385/122; 385/124
(58) Field of Classification Search ............. 385/125, 385/124, 123, 122
See application file for complete search history.

(56) References Cited

U.S. PATENT DOCUMENTS 5,726,787 A * 3/1998 Haus et al. ............ 398/80

6,201,916 B1 * 3/2001 Eggleton et al. ......... 385/122

OTHER PUBLICATIONS

"Effect of Layer-thickness randomness on gap solitons and optical bistability in nonlinear superlattices with photonic stop gaps," Zhang et al. *Physical Review B*. Apr. 1997. vol. 55, No. 16.
"Optical Bistability in Finite-Size nonlinear bidimensional photonic crystals doped by a microcavity," Centeno et al. *Physical Review B*. Sep. 2000. vol. 62, No. 12.
"Bragg-grating solitons in a semilinear dual-core system," Atai et al., *Physical Review E*. Dec. 2000. vol. 62, No. 6.
"Bistable Switching in nonlinear Bragg Gratings," Broderick. *Optics Communications*. Mar. 1998. vol. 148.
"Breaking the glass ceiling: hollow OmniGuide fibers," Johnson et al. *Proceedings of SPIE*. Photonic Bandgap Materials and Devices. 2002. vol. 4655.
"Switching dynamics of finite periodic nonlinear media: a numerical study," de Sterke et al. *Physical Review A*. Sep. 1990. vol. 42, No. 5.
"Nonlinear self-switching and multiple gap-soliton formation in a fiber Bragg grating," Taverner et al. *Optics Letters*. Mar. 1998. vol. 23, No. 5.

(Continued)

*Primary Examiner*—Kaveh Kianni
(74) *Attorney, Agent, or Firm*—Gauthier & Connors LLP

(57) ABSTRACT

A gap-soliton structure is provided. The gap-soliton structure includes a cladding structure having alternating layers of different index values. A core region is interposed between the alternating layers of index values. The core or the cladding structure includes one or more nonlinear materials so as to achieve gap-soliton bistability.

9 Claims, 9 Drawing Sheets

OTHER PUBLICATIONS

"Optical bistability in Axially Modulated Omniguide gibers," Soljacic et al. *Optics Letters*. Apr. 2003. vol. 28, No. 7.

"Low threshold optical bistable switching in an asymmetric 2/4-shifted distributed-feedback heterostructure," Janz et al. *Applied Physics Letters*. Aug. 1995. vol. 67.

"Single-Mode photonic band gap guidance of light in air," Cregan et al. *Science*. Sep. 1999. vol. 285.

"Guiding optical light in air using an all-dielectric structure," Fink et al. *Journal of Lightwave Technology*. Nov. 1999. vol. 17, No. 11.

* cited by examiner

FIG. 4A
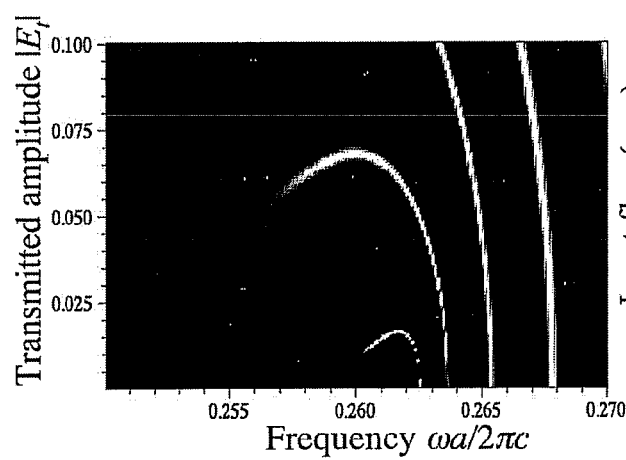
FIG. 4B
FIG. 4D
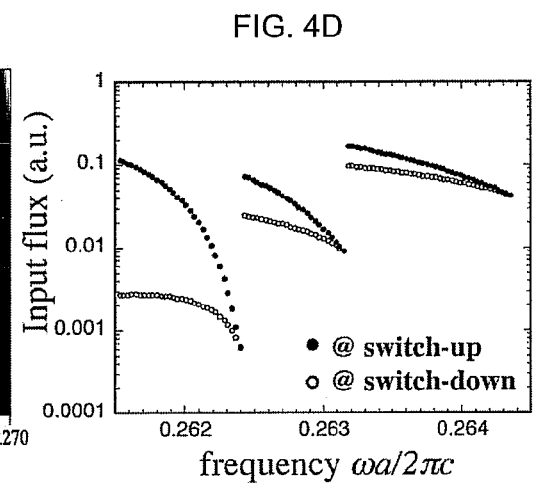
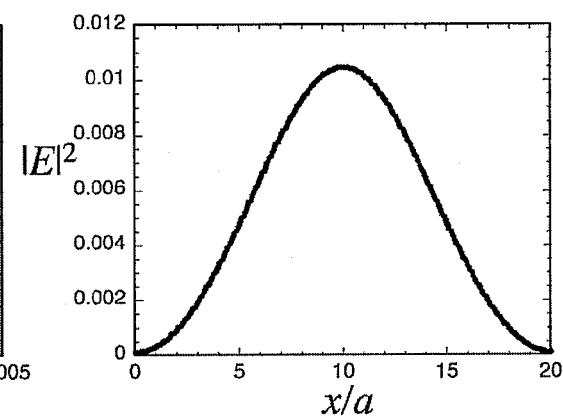
FIG. 4C

GAP-SOLITON DEVICES IN PHOTONIC CRYSTAL FIBERS

PRIORITY INFORMATION

This application claims priority from provisional application Ser. No. 60/414,768 filed Sep. 30, 2002, which is incorporated herein by reference in its entirety.

This invention was made with government support under Grant Number DMR-0213282, awarded by NSF. The government has certain rights in the invention.

BACKGROUND OF THE INVENTION

The invention relates in general to gap-solitons, and in particular to the formation of gap-solitons using photonic crystal fibers.

The amount of digital data transported around the globe grows rapidly every year. Whenever large amount of data has to be transferred, or whenever the data needs to be transferred across large distances, optical fibers are the preferred medium for transportation, due to their low losses, and high capacity. A single optical fiber (whose core is less than 10 μm in diameter) has been demonstrated to transmit more than 1 Tbit/sec, with losses less than 0.2 dB/km.

By the same token, this large amount of data needs to be processed. Currently, the capacity of an optical fiber is split between many channels, each of them carrying 10 Gbit/sec or less. Since each of the channels needs a separate set of components to operate, the tendency of the industry has been to aim at higher and higher bit rates, thus reducing the number of components in the system. Bit rates higher than 10 Gbit/sec have been demonstrated experimentally but are not yet used commercially. The reason for this is that reducing the number of components is beneficial only if the higher bit rate components are of sufficiently lower price. For example, using 40 Gbit/sec components instead of 10 Gbit/sec components is beneficial only if the price of the 40 Gbit/sec components is less than 4 times as high as the price of those operating at 10 Gbit/sec. Unfortunately, 40 Gbit/sec components are not yet commercially competitive.

To perform almost any kind of operation on optical signals today (wavelength conversion, pulse regeneration, bit-rate conversion, logic operation, etc.) the signals first need to be converted to the electronic domain. Unfortunately, there are fundamental physical reasons that prevent electronics from operating well at high frequencies. As a result, the price of electronic components grows rapidly when higher bit-rates are needed. At 40 Gbit/sec (which corresponds to operating frequency of roughly 100 GHz) there are no commercially satisfactory products today. Consequently, using all-optical signal processing becomes rapidly more and more appealing.

Since the signal processing needs to be done on ultra-fast scales, the only mechanism at disposal is to exploit a material's optical non-linearities. Most of the research in the area of all-optical devices today is in high-index-contrast integrated optics. Such devices suffer from large losses due to roughness at the surfaces of their waveguides, are highly polarization sensitive, and it is extremely difficult to couple light into them. Furthermore, since they are built using lithography, production typically involves large and very expensive semiconductor fabrication facilities.

Using in-fiber all-optical devices would solve all the problems mentioned in the previous paragraph. Silica fiber non-linearities are very low since the Kerr coefficient is very small ($2.6 \times 10^{-20}$ $m^2$/W), and since the modal area is large (100–10 $\mu m^2$). As a result, a typical telecomm signal (5 mW peak power per channel, immediately after amplifiers) needs to be propagated for very long distances before the non-linear effects become noticeable. Recently, a new type of fiber (called OmniGuide fiber) has been proposed. Materials used in this fiber have Kerr coefficients 100–1000 times higher than in silica. Furthermore, since this is a high-index contrast fiber, modal areas can be 1000–100 times smaller. Consequently, the non-linear response of these fibers is 4–6 orders of magnitude better than in silica fibers, making them an ideal non-linear medium.

Previous experimental work on gap-soliton properties and all-optical switching operation include Fiber Bragg gratings. They utilize a weak index grating written in the core of an optical fiber. It can be used for almost all nonlinear phenomena and devices. However, because of the weak grating (necessary in order to minimize scattering losses) the spectral content of the gap is very small. Combining this with the very small nonlinear coefficients of silica, enforces the need of many grating periods for the nonlinear effect to build-up and induce switching. Typical fiber lengths in such experiments are 1–10 cm, and require light powers of 10–30 $GW/cm^2$.

The use of integrated multilayer heterostructures was integral in earlier work of gap-solitons. Typically, the multilayer heterostructures utilize an AlGaAs Bragg grating heterostructure. They all generally have a small spectral gap (<1 nm), but greatly vary in the reported device size (ranged from 5 μm to 5 mm) and in operation power (1 $kW/cm^2$ to 1 $GW/cm^2$). Basic drawback is that production typically involves large and very expensive semiconductor fabrication facilities.

In both Bragg fibers and multilayer heterostructures, the grating provides the necessary spectral gap (i.e. frequency regions where waves cannot propagate) in order to observe gap-soliton bistability. However, it is the grating as well that introduces the restrictions of small spectral gap, long device sizes, expensive fabrication facilities etc. In order to circumvent the grating, we have to find other ways to induce a spectral gap for propagation.

There are many ways to induce such a change to the propagation properties of a photonic crystal fiber, and if done properly, they should all produce the desired effect. One efficient way would be by introducing a constriction on part of the fiber's length. Constricted photonic-crystal-fiber devices have been demonstrated with the Holey fiber. It was used to just locally reduce the modal area and thus enhance the nonlinear effect. In other cases it was engineered so that the modal area extended inside the cladding where it interacted with suitably placed micro-fluids inside the cladding holes.

Many device operations were demonstrated, even generation of soliton trains. Such soliton trains can easily appear in Kerr media, but are not gap-solitons, which are essential for the bistable operation. If the constrictions are chosen carefully having in mind the creation of a spectral gap for propagating guided modes, then gap-solitons are possible.

SUMMARY OF THE INVENTION

According to one aspect of the invention, there is provided a gap-soliton structure. The gap-soliton structure includes a cladding structure having alternating layers of different index values. A core region is interposed between the alternating layers of index values. The core or the cladding structure includes one or more nonlinear materials so as to achieve gap-soliton bistability.

According to another aspect of the invention, there is provided a method of forming a gap-soliton structure. The method includes forming a cladding structure having alternating layers of different index values. Also, the method includes forming a core region that is interposed between the alternating layers of index values. Furthermore, the method includes providing in the core or the cladding structure one or more nonlinear materials so as to achieve gap-soliton bistability According to another aspect of the invention, there is provided a gap-soliton structure. The gap-soliton structure includes a cladding structure having alternating layers of different index values. A core region is interposed between the alternating layers of index values. Either the core or the cladding structure is indicative to enhancing the gap-soliton bistability of the structure.

According to yet another aspect of the invention, there is provided a method of forming a gap-soliton structure. The method includes forming a cladding structure having alternating layers of different index values. Also, the method includes forming a core region that is interposed between the alternating layers of index values so that either the core or the cladding structure is indicative to enhancing the gap-soliton bistability of the structure.

BRIEF DESCRIPTION OF THE DRAWINGS

FIG. 4A is a graph in gray-scale of the transmission coefficient (white is high) shown as a function of frequency and of transmitted amplitude; FIG. 4B is a graph of the corresponding transmission vs input for a frequency of $\omega a/2\pi c=0.2623$; FIG. 4C is a graph of the intensity distribution plotted along the active core for the case of 100% transmission shown in FIG. 4B; FIG. 4D is a graph plotting the frequency dependence of the switch-up and switch-down powers;

DETAILED DESCRIPTION OF THE INVENTION

The invention is an all-optical switching device based on gap-soliton generation in photonic crystal fibers. These gap-solitons do not require a Bragg grating, thus significantly reducing implementation requirements. The large spectral dispersion and small modal area of the device also reduces the size, power, and speed requirements, making it ideal for all-optical signal processing.

In particular, the invention uses a gap-soliton that can be excited in non-linear photonic crystal fibers and is demonstrated in an embodiment involving the OmniGuide fiber. Gap solitons can be used to implement many all-optical operations including all-optical logic, pulse regeneration and reshaping, creation of ultra-narrow pulses starting from continuous wavelength (CW) signals, etc. Since they are implemented in a highly nonlinear OmniGuide fiber, observing them requires much lower power levels than in the usual silica fibers. Furthermore, the new characteristic of the gap solitons that are presented here is that they do not require a periodic modulation (like in a Bragg fiber) along the propagation direction in order to exist. This characteristic significantly reduces implementation requirements. Moreover, the effective gap that is opened in this manner is potentially much larger than in silica fibers (typically smaller than 0.1%), so the length of the device is significantly reduced. Finally, the concepts of the invention can be implemented in almost any kind of photonic crystal fiber, and are thus of wide applicability.

Figure 1:
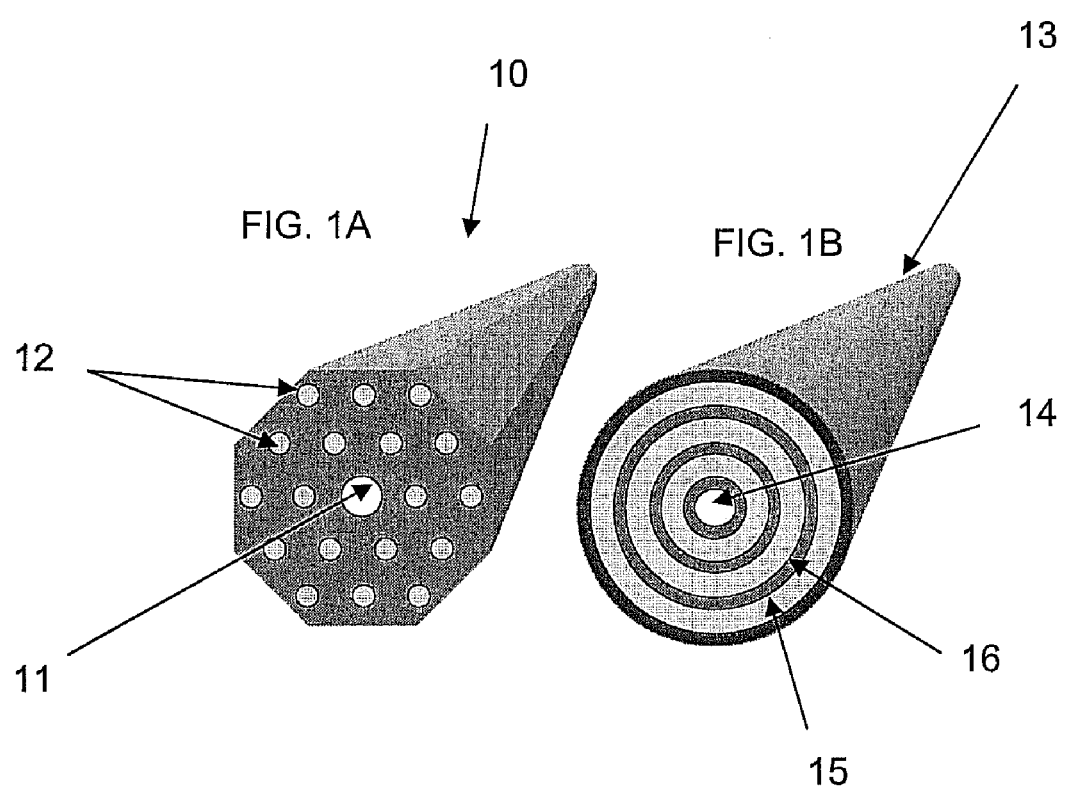
FIGS. 1A–1B show the cross sections of two photonic crystal fibers: a Holey fiber, shown as FIG. 1A, and an OmniGuide fiber, shown as FIG. 1B.

FIGS. 1A–1B show the cross sections of two photonic crystal fibers: a Holey fiber 10, shown as FIG. 1A, and an OmniGuide fiber 12, shown as FIG. 1B. These fibers consists of a core 11, 14 and a cladding, which is a 2D hexagonal array of holes 12 in the Holey fiber case and alternating high and low index layers 15, 16 in the OmniGuide fiber case. The cladding acts as a Bragg reflector confining the light into the core.

Figure 2:
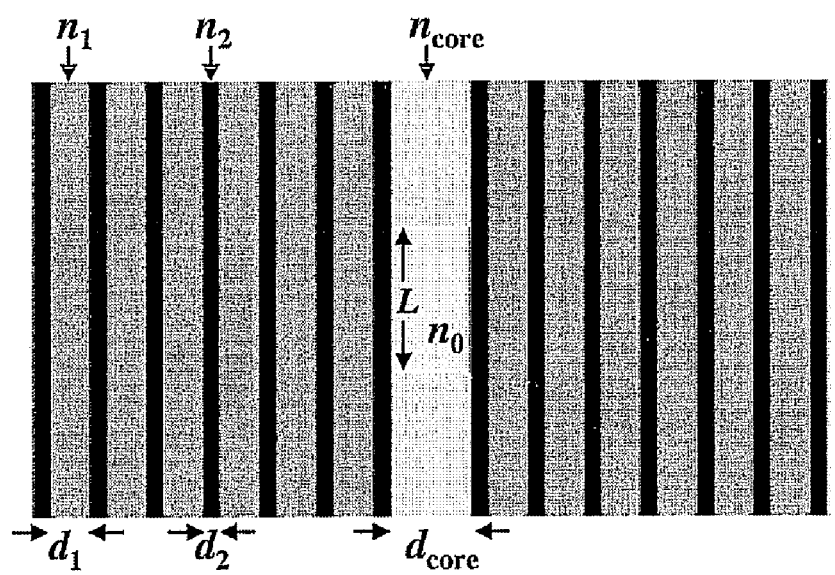
FIG. 2 is a schematic block diagram of a 2D representation of the OmniGuide fiber gap-soliton device where part of the linear core has been replaced by a non-linear core of length L.

The invention can be implemented in either fiber or any other type of photonic crystal fiber, but it suffices to demonstrate it in an embodiment involving the Omniguide fiber (2D representation), which is shown in FIG. 2. Such a simplified system yields all the physics of the full 3D structure providing excellent estimates for the power and bandwidth requirements, while in the same time it substantially reduces computational requirements. For simplicity, this 2D structure is analyzed.

Figure 3A:
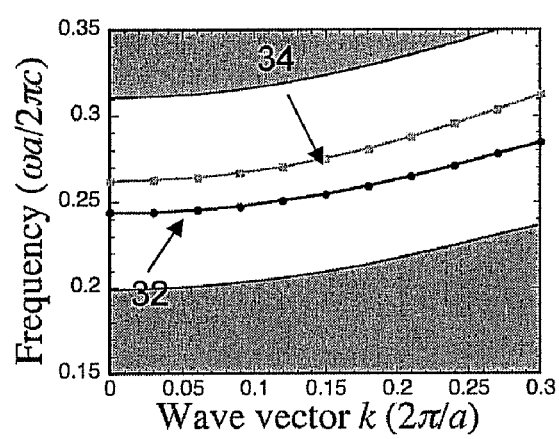
FIG. 3A is a band structure corresponding to FIG. 2 displaying the single mode operation of the fiber of FIG. 2.

The invention requires the fiber to support a single guided mode. The set of parameters that are chosen are $n_1=1.5$, $n_2=2.8$, $n_{core}=1.9$, $d_1=0.7$, $d_2=0.3$, $d_{core}=1.2$, $\alpha=d_1+d_2$ and the corresponding band structure displaying the single mode operation is shown in FIG. 3A by curve 32. In order to achieve gap-soliton-mediated bistable behavior, a highly-dispersive nonlinear region (Kerr-type: $n_{n1}=n_0+n_2|E|^2$) is needed in the core, such that it prohibits propagation for some frequencies (band-gap condition) at low light intensities (where $n_{n1}\approx n_0$), but it may allow it at higher light intensities. Up to now, such behavior was only attributed to nonlinear Bragg gratings. In this case, it is achieved very simply by replacing part of the core (say of length L along the guiding direction) with a nonlinear material of lower index ($n_0<n_{core}$), as shown in FIG. 2. For the case $n_0=1.6$ and $n_2=0.625$, the corresponding low intensity band diagram for the replaced part is shown in FIG. 3A by the curve 34. This will be the "active core", while the rest will be labeled as the "inactive core".

For low intensity and carrier frequencies below the active-core cutoff ($\omega\alpha/2\pi c=0.26215$), but still above the inactive-core cutoff ($\omega a/2\pi c=0.24353$), light will be strongly reflected. The band-gap condition necessary for bistable switching is achieved in a uniform region. This remarkable property is inherent in OmniGuide fibers, and it is because of their corresponding guided mode band structure: as $k \to 0$ and $\omega \to \omega_{cutoff}$, the group velocity $v_G \to 0$, while below $\omega_{cutoff}$, the propagation constant k becomes imaginary. This provides a great advantage over Bragg grating fibers because of its relative ease of fabrication and tunability through changing the size L and/or linear index $n_0$. Similar behavior is also expected in other types of photonic crystal fibers, thus, the invention can also be expected to work in those systems as well.

Figure 3B:
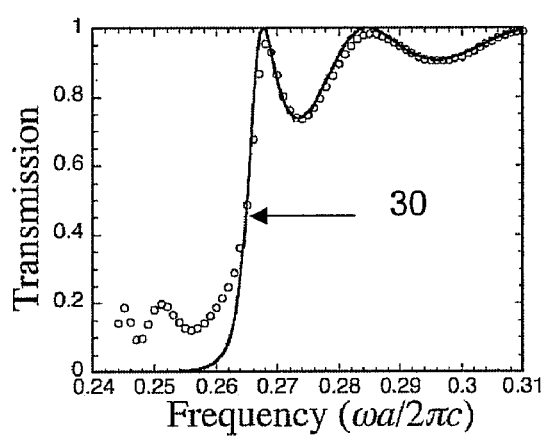
FIG. 3B is a low intensity transmission diagram corresponding to FIG. 2 when replacing part of the core with a nonlinear material of lower index.

The low intensity transmission coefficient vs frequency is shown in FIG. 3B for an active-core length of $L=5\alpha$ (open circles). Notice the sharp transmission drop below the active-core cutoff and the high-transmission resonant structure above it. The larger L is, the more structure that is above the cutoff and the sharper the transmission drop below it. The structure at low frequencies is related to light coupling out of the core and into the cladding modes that exist at larger wave vectors, thus contributing to an overall nonzero transmission. This, however, does not come into contradiction with the band-gap low-transmission requirement, since no radiation is actually going through the active core, which is the basic requirement for gap-soliton bistability. Furthermore, this cladding-mode transmission can be reduced and eventually go to zero as $n_0 \to n_{core}$, where the modal patterns of the two core regions become identical and so scattering into the cladding modes gets minimized.

Gap soliton bistability is favored at frequencies just below the active-core cutoff. In order to get some insight for the inventive system and explore the vast parameter space, an easily tractable equivalent 1D Nonlinear Transfer-Matrix model is created. The system is split into a large number of slices, within which two counter-propagating waves are assumed as the solution. If the 2D dispersion relations (FIG. 3A) are fitted to a form $\omega=\omega_0 \alpha k^2$, which is actually an excellent fit, then the propagation constant of these waves at some input frequency $\omega$ is $k=[(\omega-\omega_0-\delta\omega)/\alpha]^{1/2}$, where $\delta\omega=\delta\omega(|E|^2)$ is precalculated from simulations of the full 2D (or 3D) system. The total solution is found by matching the boundary conditions at each slice interface, starting from the output where only the transmitted wave is present, and working backwards to finally get both the incident and reflected waves.

The resulting low intensity ($\delta\omega=0$) transmission coefficient predicted by this model is shown by the line 30 in FIG. 3B. The agreement is excellent except at low frequencies where the coupling to the cladding modes occurs. This coupling is not taken into account by the 1D model, which describes only the radiation going through the active region. Agreement between the 1D model and 2D simulation for those frequencies is improved as $n_0 \to n_{core}$. The part of the radiation that goes through the active core, however, is the one responsible for the nonlinear bistable response, and as it will be shown later is very well described by the 1D model.

The 1D model is used to get some insight on the fiber's nonlinear response. An active region of $L=20\alpha$ is chosen. In FIG. 4A, a gray-scale of the transmission coefficient (white is high) is shown as a function of frequency and of transmitted amplitude. At low intensities, the transmission structure described in FIG. 3B is recovered (with more peaks since here $L=20\alpha$). At higher intensities this structure shifts towards lower frequencies ($n_2$ is positive, and $\delta\omega/\omega \propto -\delta n/n$). If an operating frequency is chosen below the cutoff (first white line), then at low incident power there is low transmission, but at some higher incident power perfect transmission is achieved.

The corresponding transmission vs input diagram for a frequency of $\omega\alpha/2\pi c=0.2623$ is shown in the FIG. 4B. This is a characteristic bistable response. At low input powers, the transmission is very low. As the input is increased, the transmission is also increased. At some specific input, the diagram folds back. This negative-slope-branch of the transmission diagram is unstable and unphysical, in reality the response makes a discontinuous jump (along the arrow) to a stable, high transmission branch. Once there, if the input is decreased, the discontinuous jump back to the low transmission branch is not going to happen at the same input, but rather at a lower input along the arrow pointing down. If an operating power is chosen between the arrows (the switch-up and switch-down power) then both transmission states are possible. Which one is actually the operating one depends on the history of the system, thus creating a bistable device suitable for applications such as switches, memory-elements, pulse regeneration, or the like.

The mechanism behind this bistable response is the creation of a stationary gap-soliton. In FIG. 4C, the intensity distribution is plotted along the active-core for the case of 100% transmission shown in FIG. 4B. The maximum index change occurs at the tip of the soliton and is $\delta n/n=0.004$, which is within the material limits. Because of this index change, this region allows and/or enhances propagation. The incident radiation couples with the gap-soliton and tunnels through the active-core.

The remaining question is how do the switch-up and switch-down powers change with frequency. It is expected that the closer the frequency is to the resonance, the lower the necessary index change required to induce bistability, and thus the lower the power requirements for switching (up to a cutoff at which switch-up and switch-down powers become equal and thus the width of the bistable loop becomes zero). In FIG. 4D, the frequency dependence of the switch-up and switch-down powers is plotted. It is seen that they become smaller and closer together as the frequency approaches the cutoff. Beyond that, a new bistability loop opens up, resulting from the shift of the second transmission resonance. Actually, there may be cases were the two loops overlap creating multistability, i.e., at a certain input power there may be three or more stable transmission branches. In most cases however, they are unstable and fall into the pulsing regime. The desire is to fine-tune the invention parameters so as to minimize the switch powers and the maximum index change and in the same time maximize the operational bandwidth.

The finite-difference-time-domain (FDTD) method is used in order to simulate the actual temporal full-nonlinear response of the invention. This FDTD method provides an exact solution to the full nonlinear time-dependent Maxwell equations for the system in question. It has been used extensively by engineers for almost 30 years, and it has been shown, in all cases tested, to faithfully reproduce all experimental data. As such, it provides a valuable and highly trustable tool for simulating the actual performance of the proposed device.

A CW input is used in all cases. There exist two different types of temporal response: a) steady-state bistability via gap-soliton formation and b) pulsating via creation and propagation of solitons. The later can not be described by an out model, which is time-independent, but the power levels at witch it is observed are predicted accurately. This type of dual response is very similar to what was observed in nonlinear gratings. It is, however, unique for the inventive system, since no index variation is necessary to achieve it. Both operations have extremely important applications.

Figures 5A, 5B:
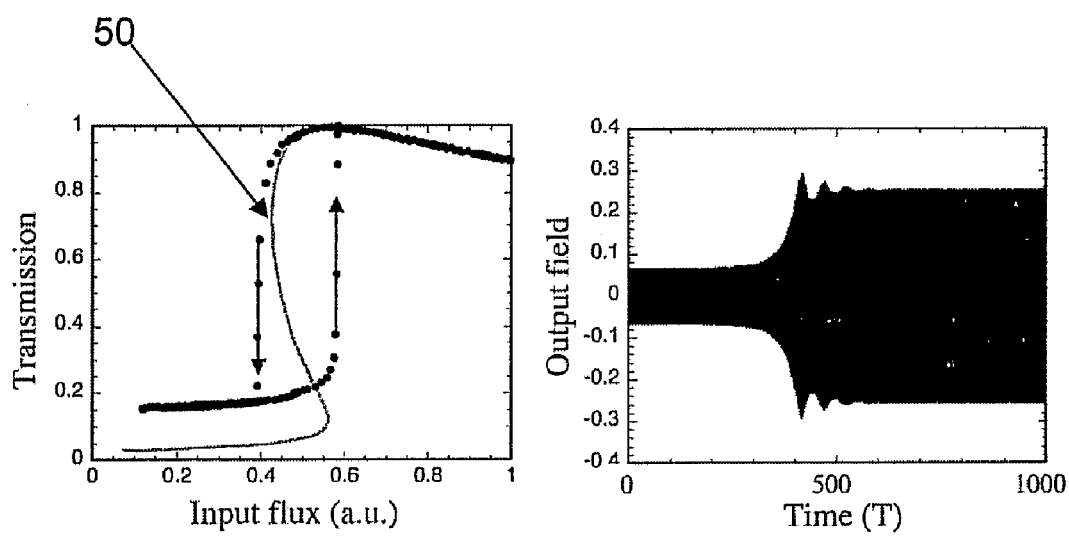
FIG. 5A is a graph plotting the transmission vs input power for a system with L=5a, as calculated numerically in time domain simulations.
FIG. 5B is a graph of the actual electric field plotted at a monitor point beyond the active core, exactly at the switch-up point indicated by the right arrow in FIG. 5A.

In FIG. 5A, the transmission vs input power is plotted for a system with L=5α, as calculated numerically in time domain simulations. The line 50 is the response predicted by the 1D model. The only place of disagreement is at low intensities, which is, as explained before, due to the coupling to the cladding modes. As suggested, though, it does not hurt the bistability predictions of the presently used model. Assuming a CW operating power of 0.5 (in the arbitrary units shown in FIG. 5A), such a device can work as a switch able to be turned on (high transmission) and off (low transmission) by external, all-optical means, such as control pulses, sudden variations of the CW amplitude, or the like.

Such operations have been described before in nonlinear gratings. The invention is, however, far superior from anything proposed before for three reasons. The first reason is the device length requirements. The spectral gap in experimentally achievable nonlinear grating fibers is created by small index modulations along the fiber length. As such it is narrow (<1%) and shallow, and a great device length (~1 cm) is necessary in order to observe switching. High-index-modulation nonlinear Bragg-grating gap-soliton devices could provide the necessary width and depth for the spectral gap, but their implementation is difficult. The inventive fiber needs no index modulation and yet the spectral gap opened is large, and most importantly, deep, maximizing dispersion (steeper band edge) and thus reducing the device size.

The second reason the invention is superior over the prior art is the low power requirement. Switching is the result of the intensity-dependent frequency shift of a transmission resonance into the gap where it overlaps with the operating frequency (see FIGS. 4A–4D). The closer the operating frequency is to the transmission resonance, the smaller the necessary frequency shift and thus the index change, reducing the required operating power. Since an initial low-transmission state is required, the steeper the transmission curve is at the band edge (see FIG. 3B), the closer the operating frequency can be tuned to the resonance while a low-transmission state is maintained. Combining this effect with the highly nonlinear materials used in OmniGuide fibers may result in significant decrease of the power requirements.

The third reason the invention is superior over the prior art is because of its fabrication requirements. By only replacing part of the core with an active one, the invention easily achieve what careful and delicate experimental procedures can only hope to achieve in other systems. This is due in part to all grating structures needing index variations of the order of the wavelength, while the inventive structure has an index variation of the order of L, which is at least an order of magnitude larger. Thus, the need for expensive semi-conductor fabrication facilities is eliminated.

In FIG. 5B, the actual electric field is plotted at a monitor point beyond the active core, exactly at the point of the discontinuous transmission jump. The initial fluctuations after the jump are because of the dumped oscillations the gap-soliton undergoes within the active core on its way to reach equilibrium. This transient time is a measure of the response (switching) time of the inventive device and is of the order of 200 periods (for λ=1.55 μm, this time is about 1 ps, i.e. processing speed 1 THz). A similar plot (but inverted and with less fluctuations) is obtained for the field at the switch down point.

Figure 6A:
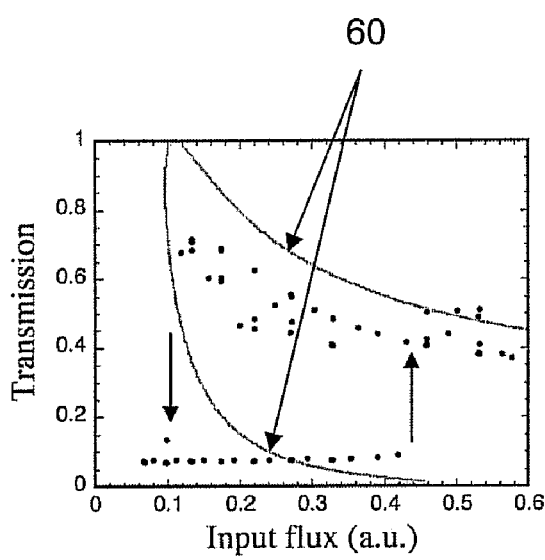
FIG. 6A is a graph of the transmission vs input shown for an L=8a system and the same operating frequency as for the L=5a system of FIGS. 5A-5B.

In FIG. 6A, the transmission vs input diagram is shown for an L=8α system and the same operating frequency as for the L=5a system of FIGS. 5A-5B. The curve 60 is the current model's prediction. The noisy transmission data at the upper branch are indicative of a pulsating response. While the model is incapable of such a complex description, it provides accurate predictions for the power levels at which switching from one state to the other happens, as well as the average power transmitted at the pulsating operating state.

Figure 6B:
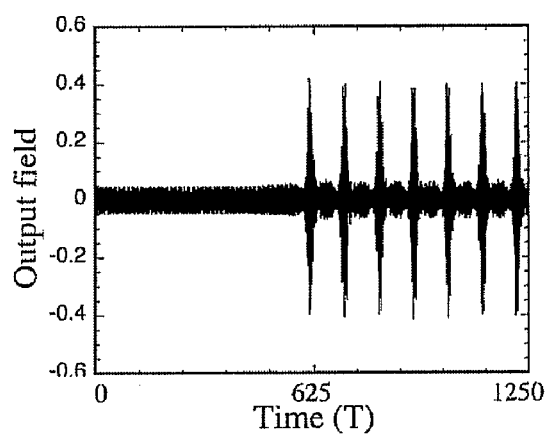
FIG. 6B is a graph of the field at a monitor point beyond the active core is plotted, exactly at the switch-up point indicated by the right arrow in FIG. 6A.

In FIG. 6B, the field at a monitor point beyond the active-core is plotted, exactly at the switch-up point indicated by the right arrow in FIG. 6A. This complex behavior occurs because the input power is enough to create a soliton and switch the system to a higher transmission state, as predicted by the model and as seen before, but, however, this soliton is not stable. While in the steady-state case, the soliton initially fluctuates and then reaches equilibrium, here it can not find this equilibrium and eventually it gets transmitted out of the active-core. Then a new soliton is created which again is unstable and gets transmitted out. The result is a periodic train of solitons, i.e. short-duration high-amplitude pulses.

In this case, the peak intensity of each pulse is about 10 times larger than that of an equivalent transmitted CW. The duration of each pulse is about 20 periods and the pulses appear at a frequency of about 100 periods (for λ=1.55 μm this is a duration of about 100 fs every 500 fs). While this may not be the state-of-the-art compared to modern pulsed-mode-operation lasers, it constitutes the simplest and cheapest way to achieve pulsed-mode-operation. Similar systems in nonlinear gratings need higher operating powers and much more experimental care than the proposed system. Another great advantage here is tunability: externally tuning (e.g. through temperature) the system parameters can give great control over the duration and period of the pulses.

The two very important applications for the proposed structure: a) steady-state bistability for high speed all-optical switching and memory, and b) pulsed for ultra-short pulse train generation from a CW input, have been analyzed. Changing from one operation mode to the other is just a matter of adjusting the device's parameters. From a series of time-domain simulations, one may deduce the following general rule of thumb: if the predicted upper-branch at the switch-up point is a high transmission state (>90%, usually achieved when switch-up and switch-down powers are close to each other), the created gap-soliton will be stable and so the response will be steady-state, otherwise the response will be pulsed. The invention may be tuned in two ways, either so that it can strictly work in one operation mode only, or tuned so that it can work in both. In the later case, switching from one operation mode to the other could be achieved by external means such as temperature, applied stress, or the like.

Figure 7:
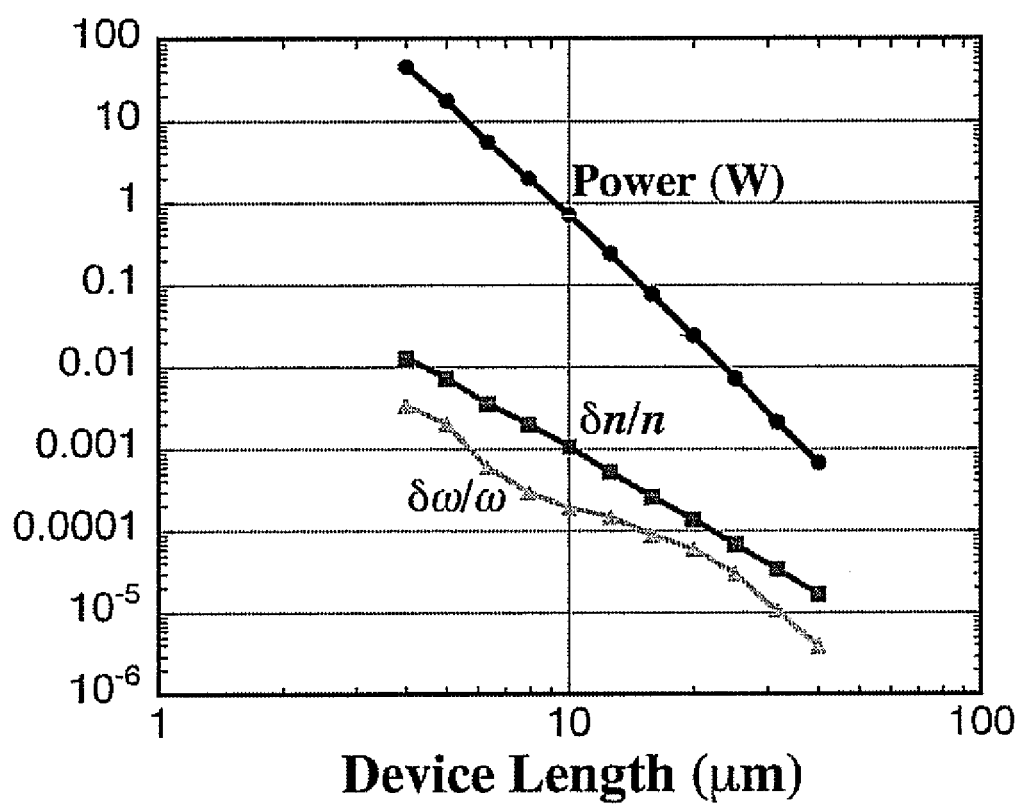
FIG. 7 is a graph of the operating power, maximum index change within the nonline-core, and bandwidth, as a function of the size of the active-core.

In FIG. 7, the three quantities of interest are plotted, namely the operating power, maximum index change within the active-core, and bandwidth, as a function of the size of the active-core. Since the order of magnitude estimates are needed, the 1D model's predictions are adequate. Note that as the inventive device length (i.e. the active-core's size) increases, the operating power and the maximum index-change within the active-core drop exponentially. Unfortunately, in the same time the available bandwidth drops as well. It is found that an optimal solution for the device length is 10 μm, for which the operating power is ~750 mW, the maximum index change within the active-core is $\delta n/n \sim 10.001$, well within material capabilities, and the operational bandwidth is $\delta\omega \sim 40$ GHz. These numbers can be further improved by optimizing the system's parameters, such as index contrasts, layer thickness, or the like.

As discussed herein, the invention includes an embodiment having a particular configuration where a part of the core is replaced by material with different linear and non-linear properties, as shown in FIG. 2. The basic requirements for this guided mode to achieve bistability are a) the corresponding guided frequencies are higher than those of the actual core creating an effective spectral gap, and b) it does not become index guided.

Figure 8A:
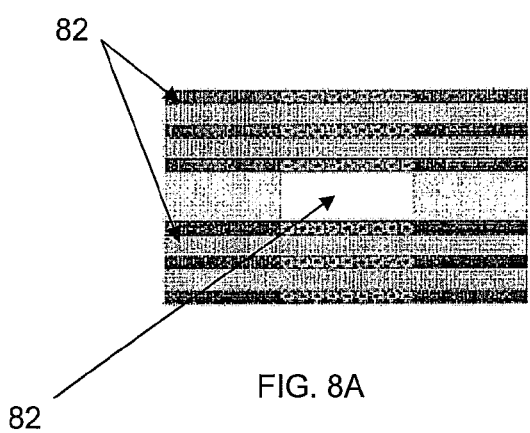
FIGS. 8A–8B are schematic block diagrams demonstrating an alternative embodiment of the invention by using the cladding instead of the core.
Figure 8B:
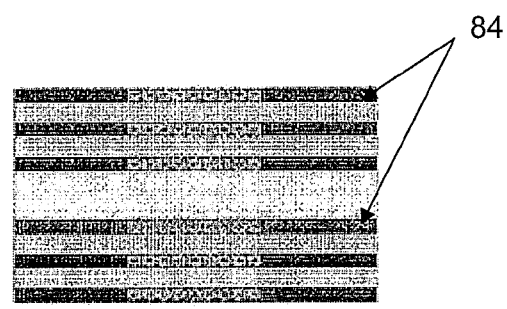

It is possible to achieve these desired properties with several different embodiments, each providing an advantage over the others in terms of the materials used or with the ease of the experimental procedure. Some of those are shown in FIGS. 8A–8B. Instead of having a highly nonlinear material 80 in the core, one can take advantage of the higher nonlinear coefficients of the high-index layers 82 in the cladding (the modal area extends in them anyway) to induce the required intensity dependent frequency shift, as shown in FIG. 8A. Furthermore, one can all-together avoid altering the core and work exclusively with the high-index layers 84 in the cladding for creating both the spectral gap and the nonlinear shift, as shown in FIG. 8B. Different settings will have the same basic operation and at most they will differ in their power and bandwidth requirements.

Figure 9:
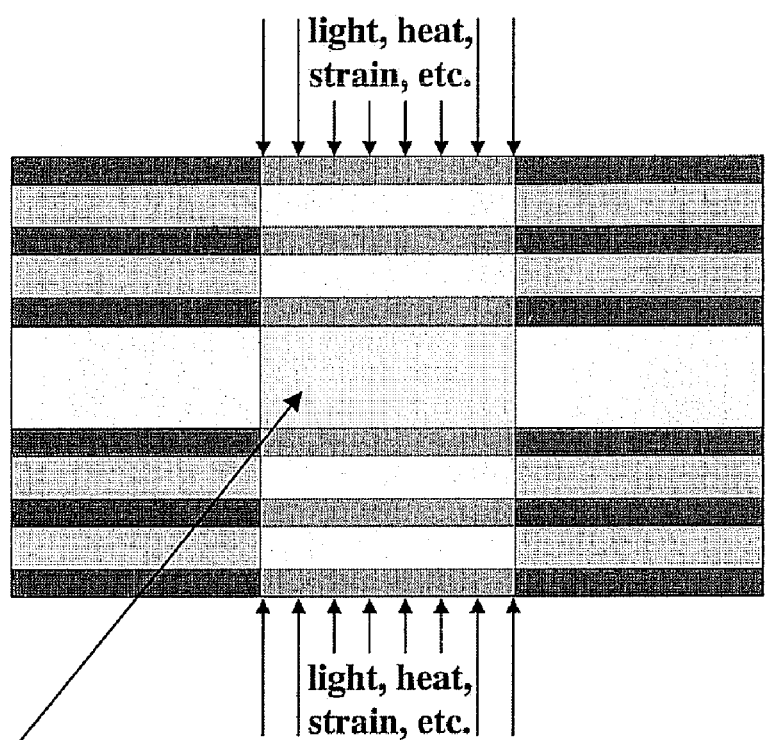
FIG. 9 is a schematic block diagram demonstrating the use of an external source to change the effective index of the cladding to accomplish properties of the invention.

The structures depicted in FIGS. 8A–8B can be easily realized by external means as well using the effective refractive index changes induced by light, heat, strain etc., as shown in FIG. 9. Alternatively, since such external means can induce changes in the device's operation, the present invention can be efficiently used as a sensor device. Depending on the actual needs, the reverse setting is also possible, i.e., the "active" part 90 being screened while the rest of the fiber is externally modified. This provides a high degree of external control and tunability for the structure. The continuous fabrication mode for the fiber makes this a very attractive solution for cheep and tunable all-optical devices.

Although the present invention has been shown and described with respect to several preferred embodiments thereof, various changes, omissions and additions to the form and detail thereof, may be made therein, without departing from the spirit and scope of the invention.

What is claimed is:

1. A gap-soliton structure comprising:
   a cladding structure having alternating layers of different index values; and
   a core region that is interposed between said alternating layers of index values wherein said core or said cladding structure is arranged so as to achieve gap-soliton bistability by introducing a modified portion in either of said cladding structure or said core region that comprises one or more non-linear materials so that propagation of certain frequencies is not allowed, wherein the index of said one or more non-linear materials is less than the index of the alternating layers of either of said cladding structure or said core region, wherein said cladding structure and core region define a photonic crystal fiber and wherein said photonic crystal fiber comprises a Holey fiber or omniguide fiber.

2. The gap-soliton structure of claim 1, wherein said photonic crystal fiber comprises an omniguide fiber.

3. The gap-soliton structure of claim 1, wherein said core performs single mode guiding of light.

4. A method of forming a gap-soliton structure comprising:
   forming a cladding structure having alternating layers of different index values;
   forming a core region that is interposed between said alternating layers of index values;
   introducing a modified portion in either of said cladding structure or said core region that comprises one or more non-linear materials so that propagation of certain frequencies is not allowed, wherein the index of said one or more non-linear materials is less than the index of the alternating layers of either of said cladding structure or said core region; and
   arranging said core and said cladding structure to define a photonic crystal fiber, wherein said photonic crystal fiber comprises a Holey fiber or omniguide fiber so as to achieve gap-soliton bistability.

5. The method of claim 4, wherein said core performs single mode guiding of light.

6. A gap-soliton structure comprising:
   a cladding structure having alternating layers of different index values; and
   a core region that is interposed between said alternating layers of index values and comprises, wherein either said core or said cladding structure is indicative to enhancing said gap-soliton bistability of said structure by introducing a modified portion in either of said cladding structure or said core region that comprises one or more non-linear materials so that propagation of certain frequencies is not allowed, wherein the index of said one or more non-linear materials is less than the index of the alternating layers of either of said cladding structure or said core region, wherein said cladding structure and core region define a photonic crystal fiber and wherein said photonic crystal fiber comprises a Holey fiber or omniguide fiber.

7. The gap-soliton structure of claim 6, wherein said core performs single mode guiding of light.

8. A method of forming a gap-soliton structure comprising:
   forming a cladding structure having alternating layers of different index values; and
   forming a core region that is interposed between said alternating layers of index values so that either said core or said cladding structure is indicative to enhancing said gap-soliton bistability of said structure by introducing a modified portion in either of said cladding structure or said core region that comprises one or more non-linear materials so that propagation of certain frequencies is not allowed, wherein the index of said one or more non-linear materials is less than the index of the alternating layers of either of said cladding structure or said core region wherein said cladding structure and core region define a photonic crystal fiber and wherein said photonic crystal fiber comprises a Holey fiber or omniguide fiber.

9. The method of claim 8, wherein said core performs single mode guiding of light.

* * * * *